Mar. 3, 1925.                                                                1,528,590
R. VARLEY
HEADLIGHT CONTROL
Filed Sept. 1, 1921                2 Sheets-Sheet 1

Richard Varley INVENTOR
BY
Thomas Howe ATTORNEY

Mar. 3, 1925.
R. VARLEY
HEADLIGHT CONTROL
Filed Sept. 1, 1921

Richard Varley INVENTOR
BY
Thomas Howe ATTORNEY

Patented Mar. 3, 1925.

1,528,590

UNITED STATES PATENT OFFICE.

RICHARD VARLEY, OF ENGLEWOOD, NEW JERSEY, ASSIGNOR TO VARLEY DUPLEX MAGNET COMPANY, A CORPORATION OF NEW JERSEY.

HEADLIGHT CONTROL.

Application filed September 1, 1921. Serial No. 497,472.

*To all whom it may concern:*

Be it known that I, RICHARD VARLEY, a citizen of the United States of America, residing at Englewood, county of Bergen, State of New Jersey, have invented new and useful Improvements in Headlight Controls, of which the following is a specification.

The present invention relates to the interrelation of circuits and switching mechanism whereby the headlights of automobiles and the like may be controlled but is not limited to such applications.

When an automobile is parked for any considerable length of time the engine is usually shut down, but sometimes, particularly where the streets are lighted so that the illumination of the headlights is not particularly noticeable, the operator may neglect to dim the lights and, the car remaining parked for a long time an unnecessary drain on the battery is occasioned.

It is the main object of the present invention to provide means for automatically controlling the headlights so that the wasteful operation thereof is avoided.

This may be accomplished by so interrelating the control of the ignition of the engine and the control of the headlights that when the ignition to the engine is cut off to stop the engine, the light current will be automatically reduced.

While it is desirable that the ignition and lighting shall be interrelated as described, it is further desirable that the lighting control shall be capable of operation at will, and it is therefore a further object of the invention that while the automatic relation as described shall exist, nevertheless the lighting control may be operated at will.

It is further desirable that while the automatic interrelation as referred to above shall exist, it is also desirable that the ignition control shall be operable at will, and it is a further object of the invention to provide automatic operation as described in such manner as to permit of the operation of the ignition switch at will.

A further object of the invention is to provide means whereby the automatic interrelation of the light and ignition switches, as above referred to, is accomplished but either the lighting or ignition switches may be moved to control their respective circuits at will.

Other and ancillary objects of the invention will appear hereinafter.

In the accompanying drawings which illustrate the invention;

Figs. 6, 7, 8 and 9 are views of detailed parts of the mechanism as will be hereinafter referred to.

Figure 1:
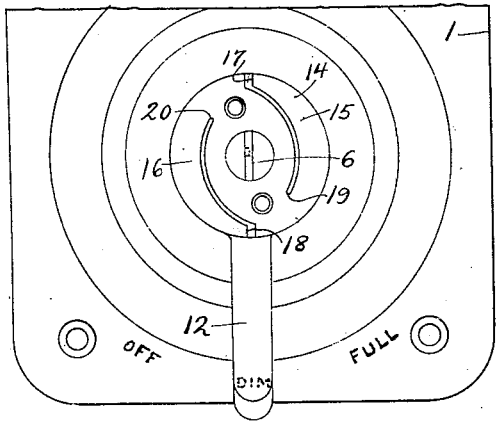
Fig. 1 is a front view of a switching mechanism embodying the invention.
Figure 2:
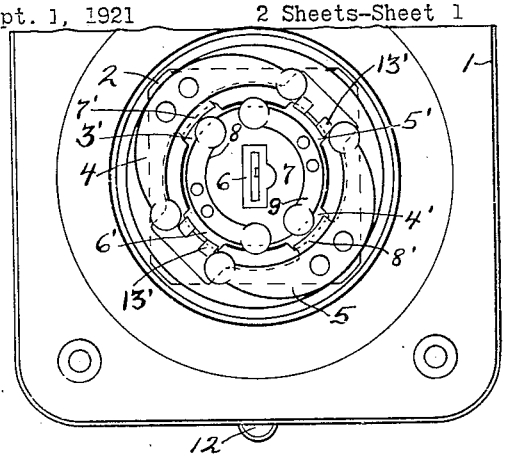
Fig. 2 is a rear view of the same showing the movable members.
Figure 3:
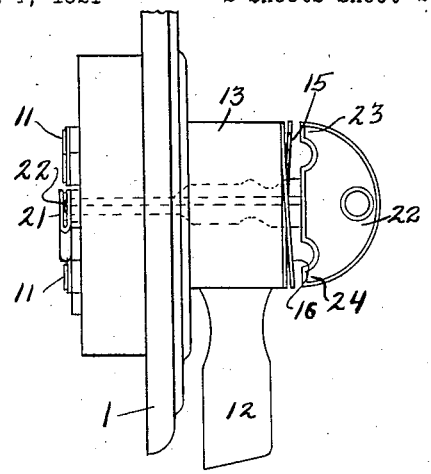
Fig. 3 is a side view showing the ignition switch in "off" position.
Figure 7:
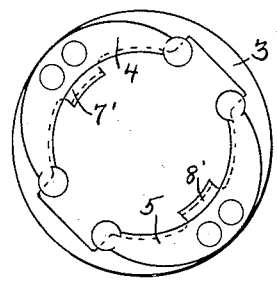
Figure 8:
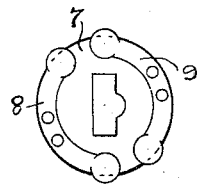
Figure 9:
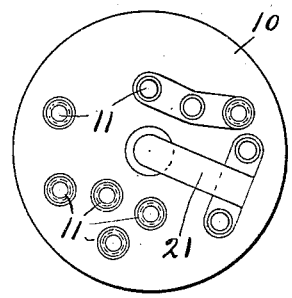
Figure 4:
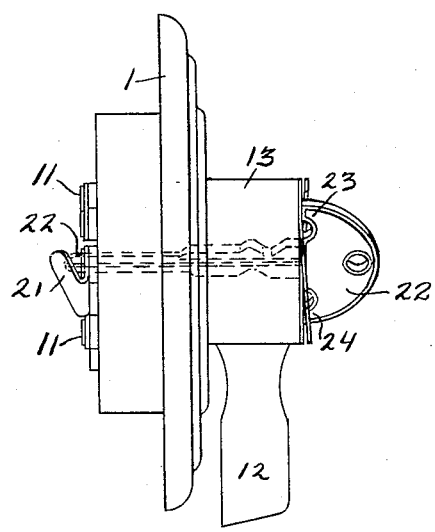
Fig. 4 is a side view showing the ignition switch key in the "on" position.
Figure 6:
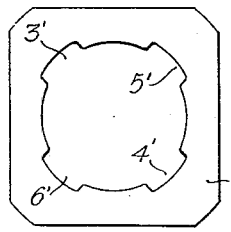

Referring to the drawings, the apparatus comprises a substantially square main frame or case 1 of metal within which is first placed the insulating fiber plate 2 against the frame, this being entered in the case through the open back end as shown in Fig. 2 (at the left in Figs. 3 and 4). The plate 2 has the notches or recesses 3', 4', 5' and 6'. Upon this is placed the metal ring 3 to which are secured the bronze fingers 4 and 5 terminating in balls, for connecting the battery with the lights. Legs 7' and 8' on the contacts 4 and 5 enter within the recesses 3' and 4', and within the contacts 4 and 5 is mounted the lock 6 carrying the insulating fiber disc 7 to which is secured the bronze fingers 8 and 9 for controlling the ignition circuit and connecting the battery in charging relation to the generator through the usual cut-out relay. The fingers 8 and 9 also terminate in balls. Upon the back of the device is mounted a fiber disc 10 carrying contacts 11 or terminal buttons adapted to engage with the movable switch contacts 4, 5, 8 and 9 to effect the desired connections. A lever 12 is provided for moving the disc 3 and its carried contacts to effect connections for full illumination of the headlights, lesser or dimmed light of the same, or cut them off entirely. This lever is secured to a rotatable drum 13 having projections 13' engaging in the recesses 5' and 6' so that the contacts 4 and 5 are turned with the lever and drum through the plate 2.

The switching mechanism as thus far described is well known in the art and need not be further described here in detail.

In the specific mechanism shown the present invention is provided for by securing to the front face of the barrel 13, whereby the lever 12 is connected with the lighting contacts, a metal plate 14 from which are struck up the spring tongues 15 and 16, the ends 17 and 18 normally projecting above the surface of the plate 14, while the ends 19 and 20 remain integral with the plate. A'so at the back of the switch upon the insulating plate 10 is mounted a spring 21 adapted to press against the end of the key 22 when inserted in the lock in position to operate the ignition switch and tend to force it out therefrom. Thus in Fig. 3 the key is shown as inserted in the lock to a certain degree but not sufficiently for it to operate the ignition contacts. When inserted sufficiently to operate those contacts as shown in Fig. 4, the spring is shown as extended by the inward movement of the key so that it tends to push the key outwardly into the position as shown in Fig. 3. The key having been inserted sufficiently in the lock, it may be turned to connect the ignition circuit of the engine in operative condition, and when turned to effect this connection the key is held from being withdrawn from the lock in a manner as is well known. When the key has been turned to the "off" position, or position of opening of the ignition circuit to shut down the engine, the spring 21 forces the key outwardly into the position as shown in Fig. 3.

With the key in the position to operate the ignition contacts as shown in Fig. 4, if it is turned in a direction to open the ignition circuit it will, if the lighting contacts are in the full "on" position, engage the ends of the tongues 15 and 16 by the wings 23 and 24 on the head of the key, and the lighting contacts wi'l be carried along with the ignition contacts as the latter are moved to the "off" position at which time the lighting contacts will be in position for dimming the headlights. In opening his ignition circuit, therefore, to stop the engine, the operator will have moved his light control contacts to "dim" position even if he has forgotten the latter, and the ignition contacts having been moved to "open" position the key is forced outwardly by the spring 11 so that it will clear the ends of the tongues 15 and 16. The moving of the light contacts, therefore, to "dim" position will be assured (if they are in "full" position) whenever the ignition circuit of the engine is opened regard'ess of the care taken by the operator, but, this having been effected the key clears the tongues as referred to so that the lighting contacts may be again moved into "full" position if desired, the present apparatus guarding against the inadvertent leaving of the light contacts in "full" position when the ignition circuit of the engine is open and the engine shut down. If, when the ignition contacts have been moved to "off" position, the light switch be again moved to its "full" position, this will not interfere with the operation of the ignition contacts because the spring tongues 15 and 16 will give to permit the wings of the key to move so as to close the ignition circuit and will then spring upwardly behind the wings so that the automatic operation of dimming the lights when the ignition is opened wi'l be accomplished. It will be apparent that while the desired automatic relation as referred to is accomplished by the apparatus described, either the lighting or ignition switch may be operated at will to be brought into any of its desired positions.

Figure 5:
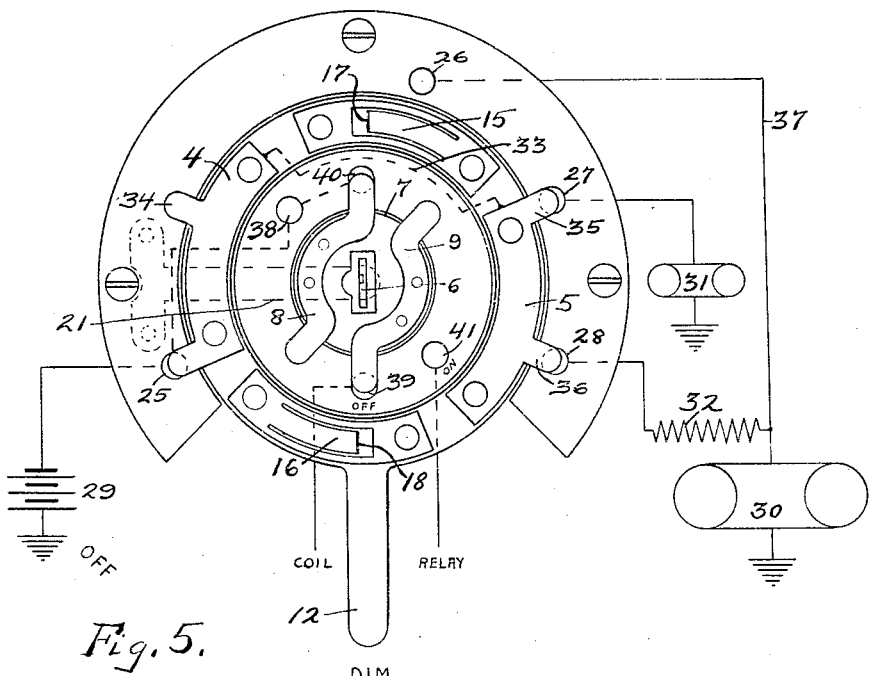
Fig. 5 is a diagrammatic view showing the circuit relations.

The connections of the apparatus may now be made more clear in connection with the diagram of Fig. 5 wherein it appears that upon the insulating plate 10 are mounted the contacts 25, 26, 27 and 28. The contact 25 is connected with one terminal of the battery 29, the other terminal of that battery being connected with the ground. The contact 26 is connected with one terminal of the headlights 30, the other terminals of those headlights being connected with the ground. The contact 27 is connected with one terminal of the tail light 31, the other terminal of that light being connected with the ground, while the contact 28 is connected with one terminal of the resistance 32 adapted to be connected in series with the headlights to dim them.

In the position of the parts as shown, the ignition circuit is open, the lock being in position wherein the key can be withdrawn and also the light control switch is in the "dim" position, circuit being made from the ground through the battery, contact 25, finger 4, conductor 33, finger 5, through the contact 27 and the tail light to ground and through contact 28, the resistance 32 and the headlight to ground. If it be desired to throw light on "full" the lever 12 can be pushed to the right (see Figs. 1 to 5) to the "full" position when the contacts 4 and 5 will be moved in a counter-clock-wise direction, the portion 34 of the finger 4 maintaining connection with the battery at the contact 25 while the portions 35 and 36 will be respectively moved into engagement with the contacts 26 and 27 thereby establishing connection through the headlight by means of a conductor 37, the circuit through the resistance 32 being open at contact 28 while the circuit through the tail light will be accomplished by the contact portion 36 and contact 27. The tail light is thus lighted no matter whether the headlight is "full" or "dim."

Also the lighting contacts 4 and 5 may be moved by the lever 12 into the "dim" position again or by throwing the lever to the "off" position (the extreme left in Figs. 1 and 5) the fingers 4 and 5 will be disengaged from any contacts and both the head and tail lights will be extinguished.

With the parts in the position as shown, if it be desired to close the ignition circuit to start the car, the key is inserted in the lock and turned in a counter-clock-wise direction (Figs. 1 and 5) when the contact 8 will be brought into engagement with the contact 38 connected with the battery, and the contact 39 connected with the usual induction coil and thus with the ignition circuit of the internal combustion engine usual for propelling automobiles. Also the contact 9 will be moved into engagement with the contact 40 which is connected with the battery, and the contact 41 connected with one terminal of the generator driven by the above engine, through the usual cut-out relay. The ignition circuit will thus be closed and the battery connected in charging relation to the generator subject to the control of the cut-out switch if the generator voltage should fall too low.

As before stated, if the lighting switch is already in the "full" position the key will ride over the tongues 15 and 16 in closing the ignition circuit. If while the ignition circuit is closed it be desired to throw the lighting switch into "full" position from one of its other positions this can readily be done, the raised ends of the tongues 15 and 16 moving into a position adjacent to the wings 23 and 24 of the key and can be moved in a reverse direction to dim or extinguish the lights at will without interference by the key. If, however, the lighting contacts are in "full" position the key cannot be turned to open the ignition switch without engaging with the raised ends of the tongues 15 and 16 and carrying the lighting contacts to the "dim" position, at which point the ignition contacts will be in open circuit position and the key will be forced outwardly by the spring 11 so as to clear the tongues 15 and 16 so that the lighting contacts may be again thrown into the "full" position if desired. Obviously the movement of the lighting contacts from the "dim" position to the "off" position are entirely independent of the ignition contacts or the operating key.

Figure 10:
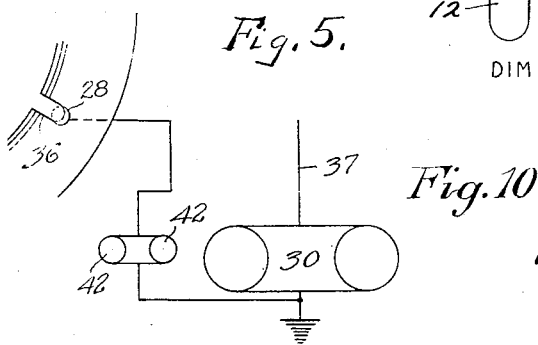
Fig. 10 is a partial diagrammatic view showing a modification of a portion of the circuit arrangement of Fig. 5 to provide for parking lights in lieu of dimming the main lights.

In many headlights, instead of dimming the main lamps by inserting a resistance in series with them, dimming of the headlights is secured by mounting lights of smaller intensity or "parking" lamps in the headlights, the main lamps being cut-out and the "parking" lamps being connected in circuit when it is desired to accomplish dimming. This may be effected with the apparatus shown in Fig. 10 by simply omitting the resistance 32 and in place thereof connecting one terminal of the "parking" lamps 42 with the contact 28 and the other terminal with the ground.

While the invention has been illustrated in what is considered its best application it may have other embodiments without departing from its spirit and is not limited to the structure shown in the drawings.

What I claim is:

1. The combination with a source of electro-motive force, of a lighting circuit including switch contacts having "full," "dim" and "off" positions, an ignition circuit including switch contacts having "on" and "off" positions, means for causing said lighting contacts to move into "dim" position as said ignition contacts are moved from "on" to "off" position, said lighting contacts being movable at all times at will except while being moved into "dim" position with the ignition contacts.

2. The combination with a source of electro-motive force, of a lighting circuit including switch contacts having "full," "dim" and "off" positions, an ignition circuit including switch contacts having "on" and "off" positions, of means for causing said lighting contacts to move into "dim" position as said ignition contacts are moved from "on" to "off" position, said ignition contacts being movable at all times at will and said lighting contacts being movable at all times at will except while being moved into "dim" position with the ignition contacts.

3. The combination of a source of electro-motive force, of a lighting circuit including a movable switch element having "full", "dim" and "off" positions, an ignition circuit including a second movable switch element having an "off" and an "on" position, an operating member for each switch element, and interengaging means between the first switch element and the operating member for the second switch element arranged to move the first switch element from "full" to "dim" position as the said operating member for the second switch element is moved from "on" to "off" position.

4. The combination of a source of electromotive force of a lighting circuit including a rotatable switch element having "full", "dim" and "off" positions, an ignition circuit including a second rotatable switch element coaxially mounted with the first switch element and having "off" and "on" positions, an operating member for each switch element, and interengaging means between the first switch element and the operating member for the second switch element arranged to move the first switch element from "full" to "dim" position as the said operating member for the second switch element is moved from "on" to "off" position.

5. The combination of a source of electromotive force, of a lighting circuit including a rotatable switch element having "full", "dim" and "off" positions, an ignition circuit including a second rotatable switch element coaxially mounted with the first switch element and having "off" and "on" positions, an operating member for each switch element, and yieldable interengaging means between the first switch element and the operating member for the second switch element arranged to yield and permit independent movement of the switch elements in the direction to move the ignition switch element from "off" to "on" positions and to lock the two switch elements together for combined movement in the direction to move the ignition switch element from "on" to "off" positions.

6. The combination of a source of electromotive force, of a lighting circuit including a rotatable switch element having "full", "dim" and "off" positions, an ignition circuit including a second rotatable switch element coaxially mounted with the first switch element and having "off" and "on" positions, an operating handle for the first switch element, a key insertable axially into both switch elements and adapted to operate the second switch element, and a yieldable part on the first switch element adapted to engage the key and to yield and permit independent movement of the switch elements in the direction to move the ignition switch element from "off" to "on" positions and to lock the two switch elements together for combined movement in the direction to move the ignition switch element from "on" to "off" positions.

7. The combination of a source of electromotive force, of a lighting circuit including a rotatable switch element having "full", "dim" and "off" positions, an ignition circuit including a second rotatable switch element coaxially mounted with the first switch element and having "off" and "on" positions, an operating handle for the first switch element, a key insertable axially into both switch elements and adapted when fully inserted to operate the second switch element, a spring tending to move the key out from its fully inserted position, and a struck-up spring tongue on the face of the first switch element having its free end normally outstanding from the face and adapted to engage the key when the key is fully inserted but to clear the key when the key is moved out under the influence of the said spring, the parts being so related that the ignition switch element is movable at all times at will while the lighting switch element will be moved by the key from "full" to "dim" positions as the ignition switch element is moved from "on" to "off" positions.

8. The combination with a lighting circuit including a set of contacts and lighting means, of an engine having an ignition circuit including a second set of contacts, said sets of contacts being rotatably and coaxially mounted, an operating key movable longitudinally along said axis into position to operate the said ignition contacts, a spring tending to force said key longitudinally out of contact operating position, means for preventing the forcing of the key out of contact operating position when it has been rotated from the "off" position, the said lighting contacts having "full" and "dim" positions and means for operatively relating the said lighting contacts to said key comprising means engaging said key to move the said lighting contacts to "dim" position as said ignition contacts are moved to the "off" position, but the last mentioned means being adapted to permit the key to pass without engagement when the key is moved to move the said ignition contacts into "on" position.

In testimony whereof I have signed this specification this 20th day of August 1921.

RICHARD VARLEY.